(12) United States Patent
Fong (10) Patent No.: US 7,673,717 B2
(45) Date of Patent: Mar. 9, 2010

(54) ANTI-THEFT DEVICE FOR A VEHICLE

(76) Inventor: Jian-Jhong Fong, No. 37, Alley 54, Lane 944, Sec. 2, Jhongshan Rd., Changhua City, Changhua County 500 (TW)

( * ) Notice: Subject to any disclaimer, the term of this patent is extended or adjusted under 35 U.S.C. 154(b) by 359 days.

(21) Appl. No.: 11/676,446

(22) Filed: Feb. 19, 2007

(65) Prior Publication Data

US 2008/0196456 A1 Aug. 21, 2008

(51) Int. Cl.
*B62D 1/16* (2006.01)
*B60R 25/02* (2006.01)

(52) U.S. Cl. ............................ 180/78; 180/287; 74/492

(58) Field of Classification Search .................. 180/404, 180/287, 78; 280/771; 74/492, 493; 464/901, 464/182; 403/109.1, 109.2, 109.8
See application file for complete search history.

(56) References Cited

U.S. PATENT DOCUMENTS

| 1,437,480 | A | * | 12/1922 | Vanderlip | ..................... 70/223 |
| 4,940,105 | A | * | 7/1990 | Matsunaga et al. | .......... 180/404 |
| 6,107,694 | A | * | 8/2000 | Mostrom | .................... 307/10.2 |
| 6,899,196 | B2 | * | 5/2005 | Husain et al. | ............... 180/402 |
| 2003/0127274 | A1 | * | 7/2003 | Dominke et al. | ............ 180/402 |

* cited by examiner

*Primary Examiner*—Ruth Ilan
*Assistant Examiner*—Keith Frisby (57) ABSTRACT

An anti-theft device includes a first steering column, a second steering column, a clutch and an actuating unit. The first steering column is connected to a steering wheel. The second steering column is connected to a universal joint. The actuating unit moves the clutch between a first position for connecting the first steering column to the second steering column and a second position for disconnecting the first steering column from the second steering column.

9 Claims, 8 Drawing Sheets

ANTI-THEFT DEVICE FOR A VEHICLE

BACKGROUND OF INVENTION

1. Field of Invention

The present invention relates to an anti-theft device for a vehicle and, more particularly, to an anti-theft device for switching a steering column set to a neutral mode in attempted theft so that a steering wheel is separated from a universal joint of a steering mechanism.

2. Related Prior Art

Thieves steal vehicles for various purposes. Some of the thieves drive stolen vehicles for fun. Some others drive stolen vehicles for worse crimes. Some others sell stolen vehicles. Some others dismantle stolen vehicles and sell the parts. Some others extort ransom from vehicle owners. A lot of thieves steal a lot of vehicles. To stop thieves, a lot of anti-theft devices have been devised.

There have been crane-shaped locks, gear stick locks and steering wheel locks in early days. However, none of these locks has enjoyed a long term of success. For example, a steering wheel can be released by picking a steering wheel lock. Alternatively, the steering wheel can be cut from a steering column. The steering column can be clamped and maneuvered by a tool. The tool can be maneuvered to rotate the steering column and therefore steer a vehicle.

Engine code locks, chip locks and GPS devices are popular in these days. They are however expensive. Moreover, none of them has enjoyed a long term of success.

Examples of conventional anti-theft devices are found in Taiwanese Patent Publication Nos. 159411 and 345141 for example. Each of these anti-theft devices is integrated with a steering wheel. The anti-theft device is used to allow the rotation of the steering wheel relative to the steering column. Thus, a thief can maneuver the steering wheel but cannot maneuver the steering column.

The present invention is therefore intended to obviate or at least alleviate the problems encountered in prior art.

SUMMARY OF INVENTION

The primary objective of the present invention is to provide an anti-theft device for switching a steering column set to a neutral mode in attempted theft so that a steering wheel is separated from a universal joint of a steering mechanism.

According to the present invention, an anti-theft device includes a steering column set, a clutch and an actuating unit. The steering column set includes a first steering column and a second steering column. The first steering column is connected to a steering wheel. The second steering column is connected to a universal joint connected to a steering mechanism. The actuating moves the clutch between a first position for connecting the first steering column to the second steering column and a second position for disconnecting the first steering column from the second steering column.

Other objectives, advantages and features of the present invention will become apparent from the following description referring to the attached drawings.

BRIEF DESCRIPTION OF DRAWINGS

The present invention will be described via detailed illustration of two embodiments referring to the drawings.

DETAILED DESCRIPTION OF EMBODIMENTS

Figure 1:
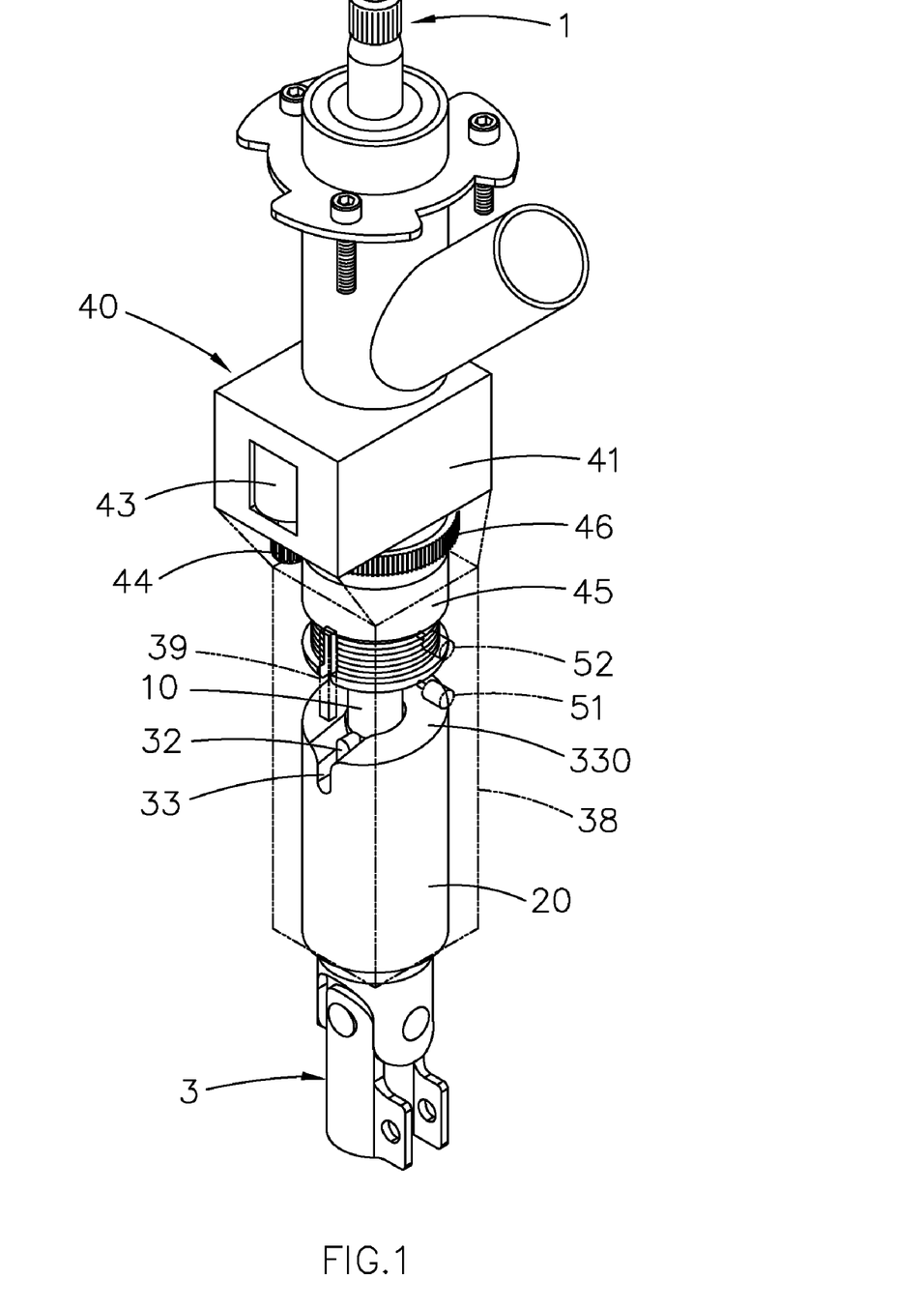
FIG. 1 is a perspective view of an anti-theft device according to the first embodiment of the present invention.
Figure 2:
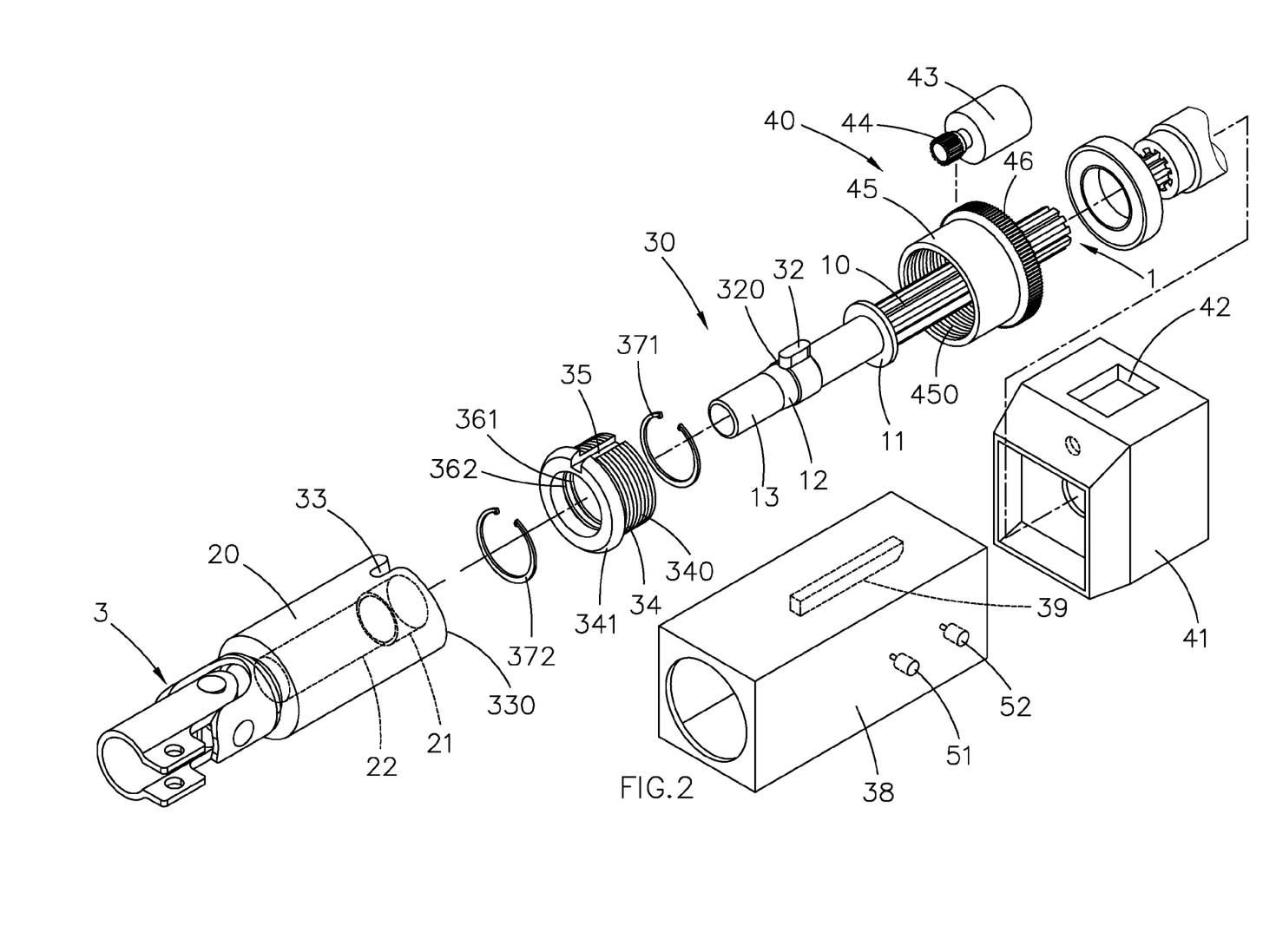
FIG. 2 is an exploded view of the anti-theft device shown in FIG. 1.
Figure 3:
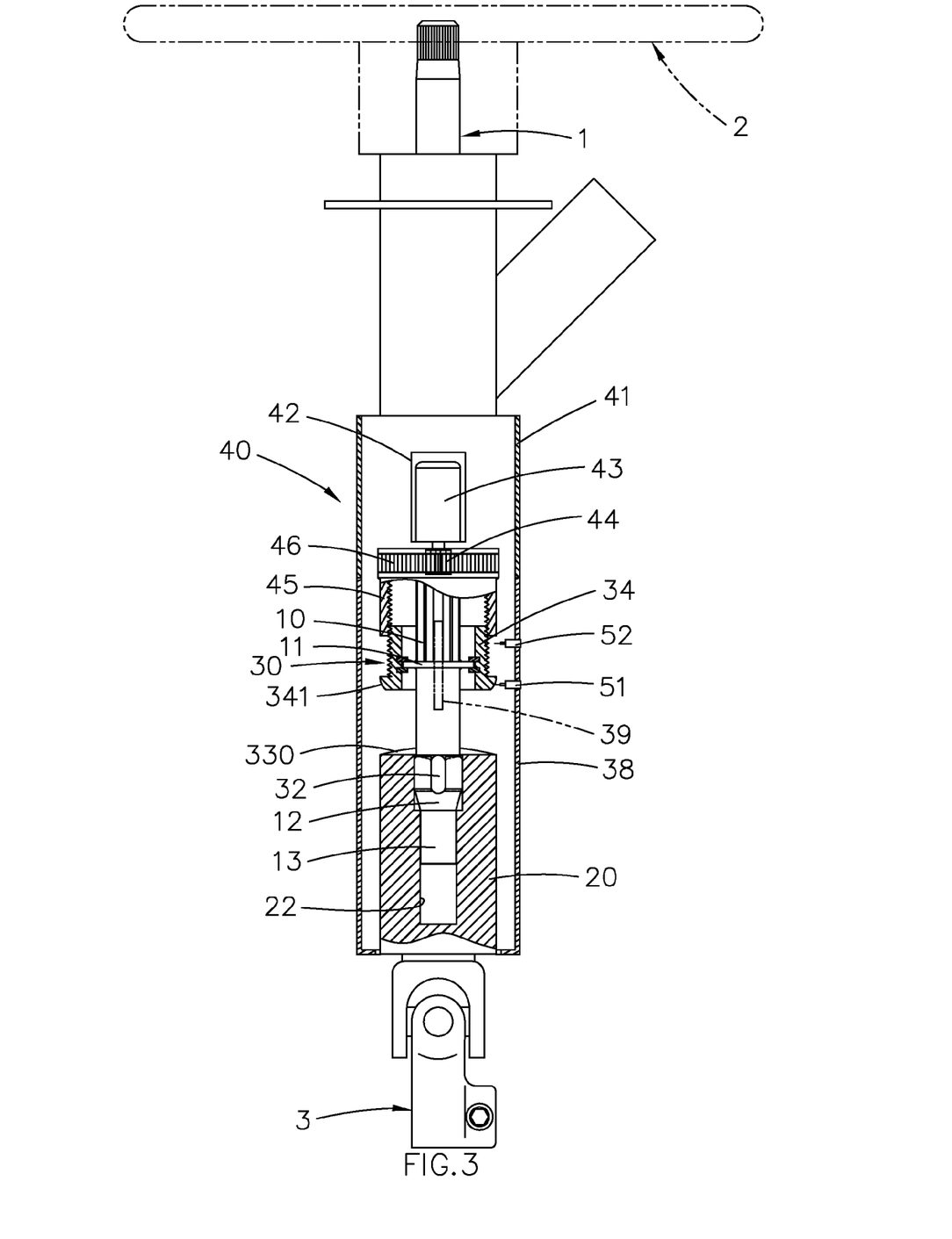
FIG. 3 is a cross-sectional view of the anti-theft device of FIG. 1.

Referring to FIGS. 1 through 3, a steering column set 1 is arranged between a steering wheel 2 and a universal joint 3. The steering column set 1 is provided with an anti-theft device according to a first embodiment of the present invention.

The steering column set 1 includes a first steering column 10 connected to the steering wheel 2 and a second steering column 20 connected to the universal joint 3. The anti-theft device includes a clutch 30 arranged between the first steering column 10 and the second steering column 20 and an actuating unit 40 for actuating the clutch 30.

The first steering column 10 is connected to a steering wheel 2 at an end. The first steering column 10 is formed with a conical frustum 12 near a reduced opposite end 13, a longitudinal ridge 32 near the conical frustum 12 and an annular flange 11 near the longitudinal ridge 32. The longitudinal ridge 32 includes a rounded end 320.

The socket column 20 defines an axial aperture 21 and an axial cavity 22 in communication with the axial aperture 21. The diameter of the axial aperture 21 is larger than that of the axial cavity 22. A cutout 33 is made in an inclined end 330 of the second steering column 20.

The clutch 30 includes a collar 34, two C-clips 371 and 372 and a shell 38. The collar 34 defines two annular grooves 361 and 362 on an internal side and a longitudinal groove 35 on an external side. A thread 340 and an annular flange 341 are formed on the external side of the collar 34.

The end 13 of the first steering column 10 is inserted through the collar 34 so that the annular flange 11 is located between the annular grooves 361 and 362. The C-clips 371 and 372 are fit in the annular grooves 361 and 362, respectively, to restrain the annular flange 11.

The shell 38 is formed with a track 39 on an internal side. The end 13 of the first steering column 10, the collar 34 and the second steering column 20 are disposed in the shell 38. The track 39 is disposed in the longitudinal groove 35. Thus, the collar 34 is not rotational but movable in the shell 38.

The actuating unit 40 includes a transmission element, a pinion 44, a motor 43 and a shell. The transmission element is a combination of a nut 45 with a gear 46. The nut 45 includes a thread 450 formed on an internal side. The thread 450 is engaged with the thread 340. The pinion 44 is engaged with the gear 46. The mandrel of the motor 43 is connected to the pinion 44.

The shell 41 defines an axial space and a peripheral window 42 in communication with the axial space. The transmission element is disposed in the axial space of the shell 41. The transmission element is rotational but not movable in the shell 41. The motor 43 is disposed in the window 42.

The actuating unit 40 can be connected to and controlled by a code lock, a fingerprint-identify system, a chip lock, an ignition of a vehicle or a central control unit.

Figure 4:
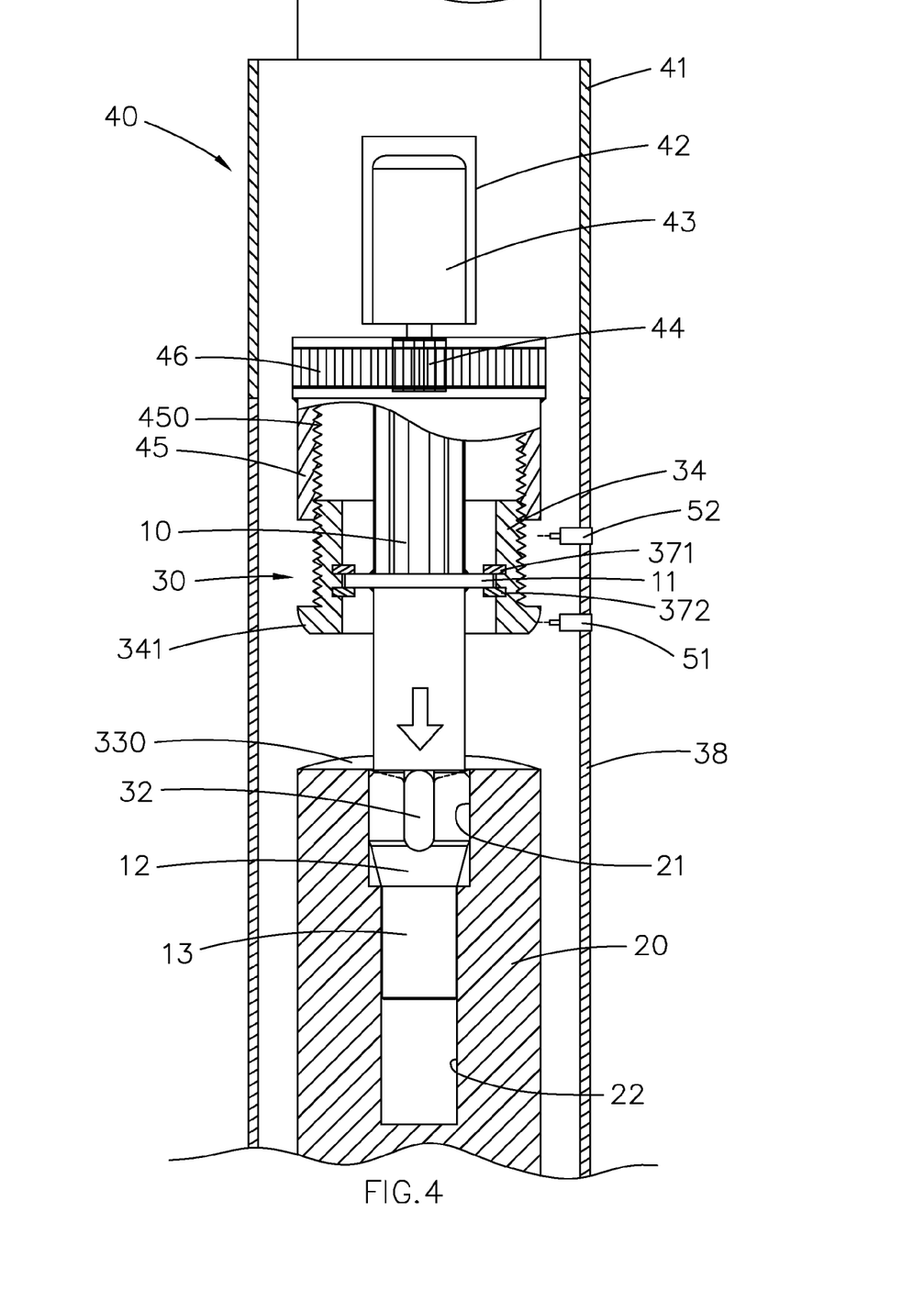
FIG. 4 is an enlarged partial view of the anti-theft device of FIG. 1.

Referring to FIG. 4, the actuating unit 40 is turned on so that the motor 43 rotates the pinion 44 in a direction. The pinion 44 rotates the gear 46. The gear 46 rotates the nut 45. Because of the engagement of the thread 450 with the thread 340 and the engagement of the longitudinal groove 35 with the track 39, the nut 45 moves the collar 34 and the first steering column 10 to a lower position within the shell 38. The ridge 32 is inserted into the cutout 33. The rounded end 320 of the ridge 32 is guided by the inclined end 330 of the second steering column 20 so that the insertion of the ridge 32 into the cutout 33 is smooth. The rotation of the first steering column 10 causes the rotation of the second steering column 20. That is, the turning of the steering wheel 2 causes the operation of the universal joint 3.

Figure 5:
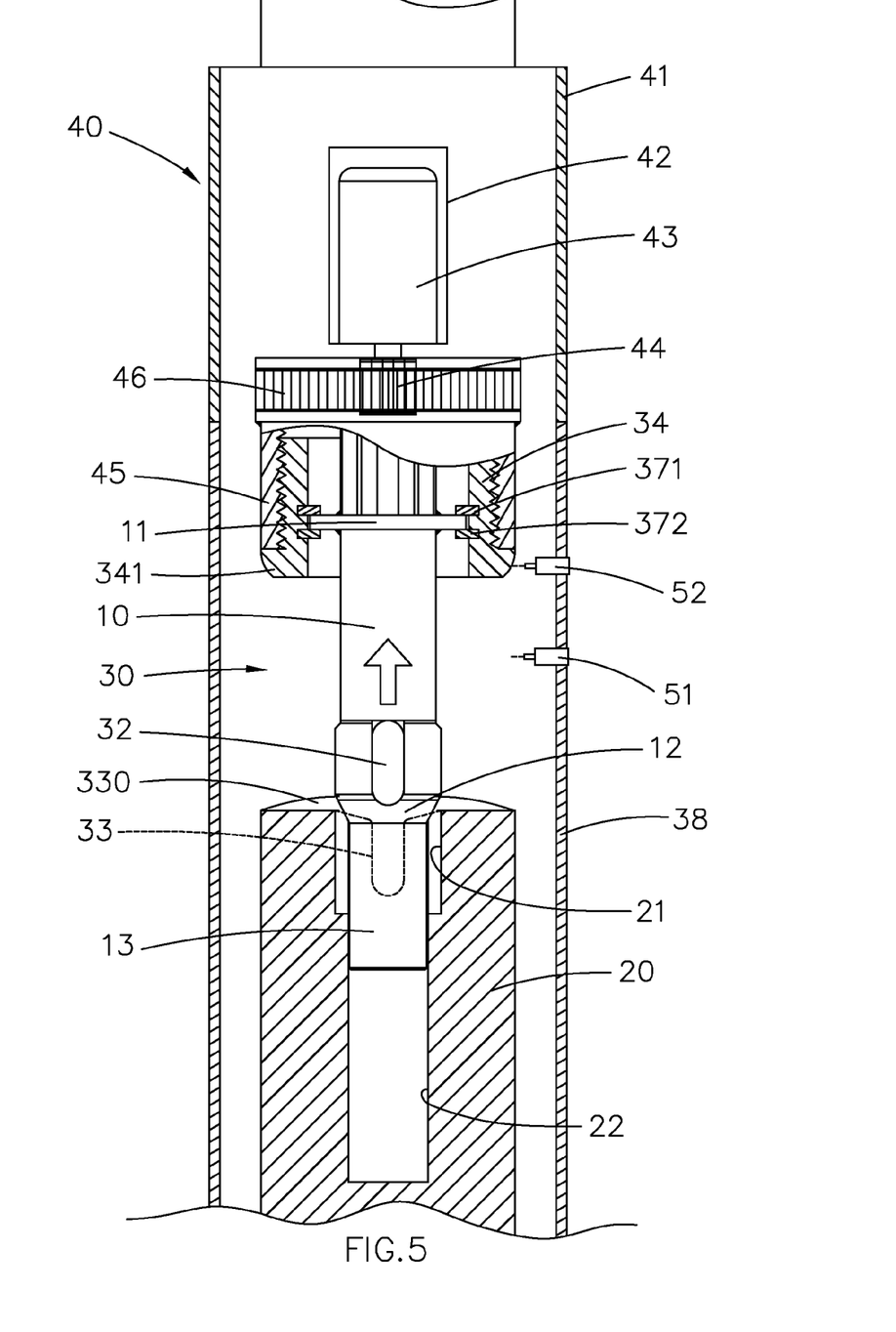
FIG. 5 shows the anti-theft device in another position than shown in FIG. 4.

Referring to FIG. 5, the actuating unit 40 is turned on so that the motor 43 rotates the pinion 44 in an opposite direction. The pinion 44 rotates the gear 46. The gear 46 rotates the nut 45. The nut 45 moves the collar 34 and the first steering column 10 to an upper position. The ridge 32 is moved out of the cutout 33. The rotation of the first steering column 10 does not cause the rotation of the second steering column 20. That is, the turning of the steering wheel 2 does not cause the operation of the universal joint 3.

There may be a security unit for preventing excessive movement of the first steering column 10. The security unit includes two sensors 51 and 52 attached to the internal side of the shell 38. The movement of the annular flange 341 is limited by the sensors 51 and 52. On sensing the annular flange 341, the sensor 51 or 52 turns off the actuating unit 40.

Figure 6:
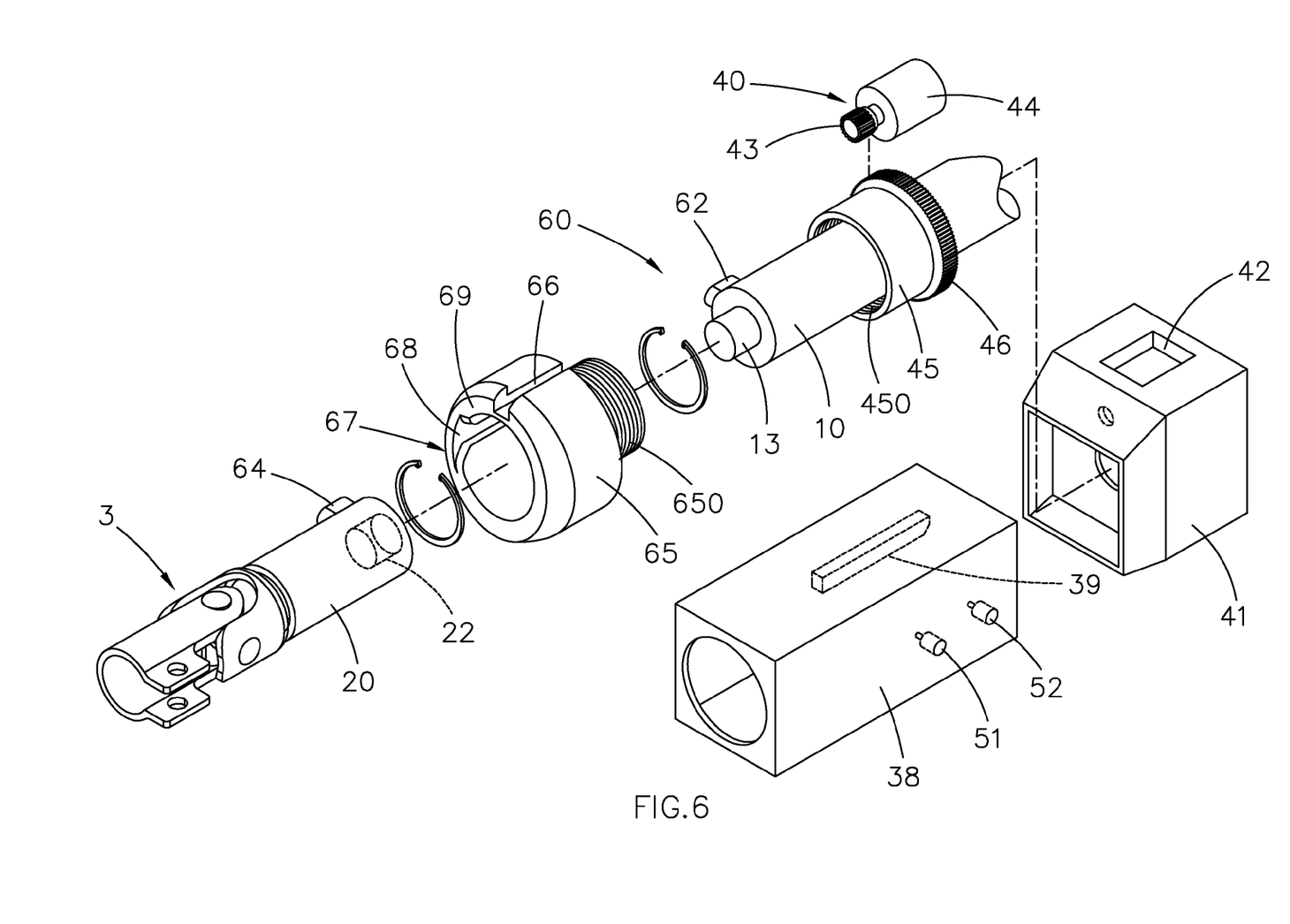
FIG. 6 is an exploded view of an anti-theft device according to the second embodiment of the present invention.
Figure 7:
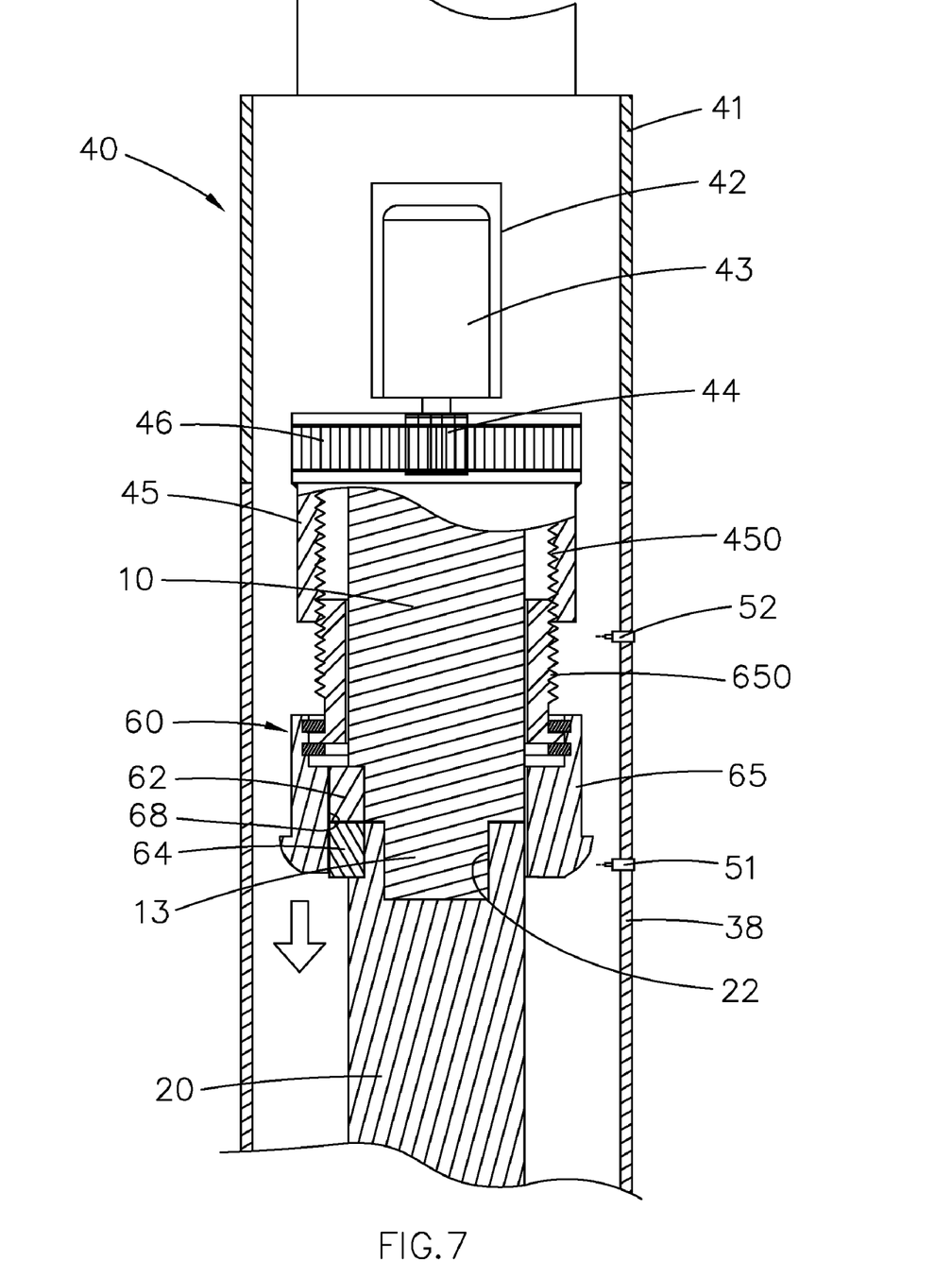
FIG. 7 is a cross-sectional view of the anti-theft device of FIG. 6.
Figure 8:
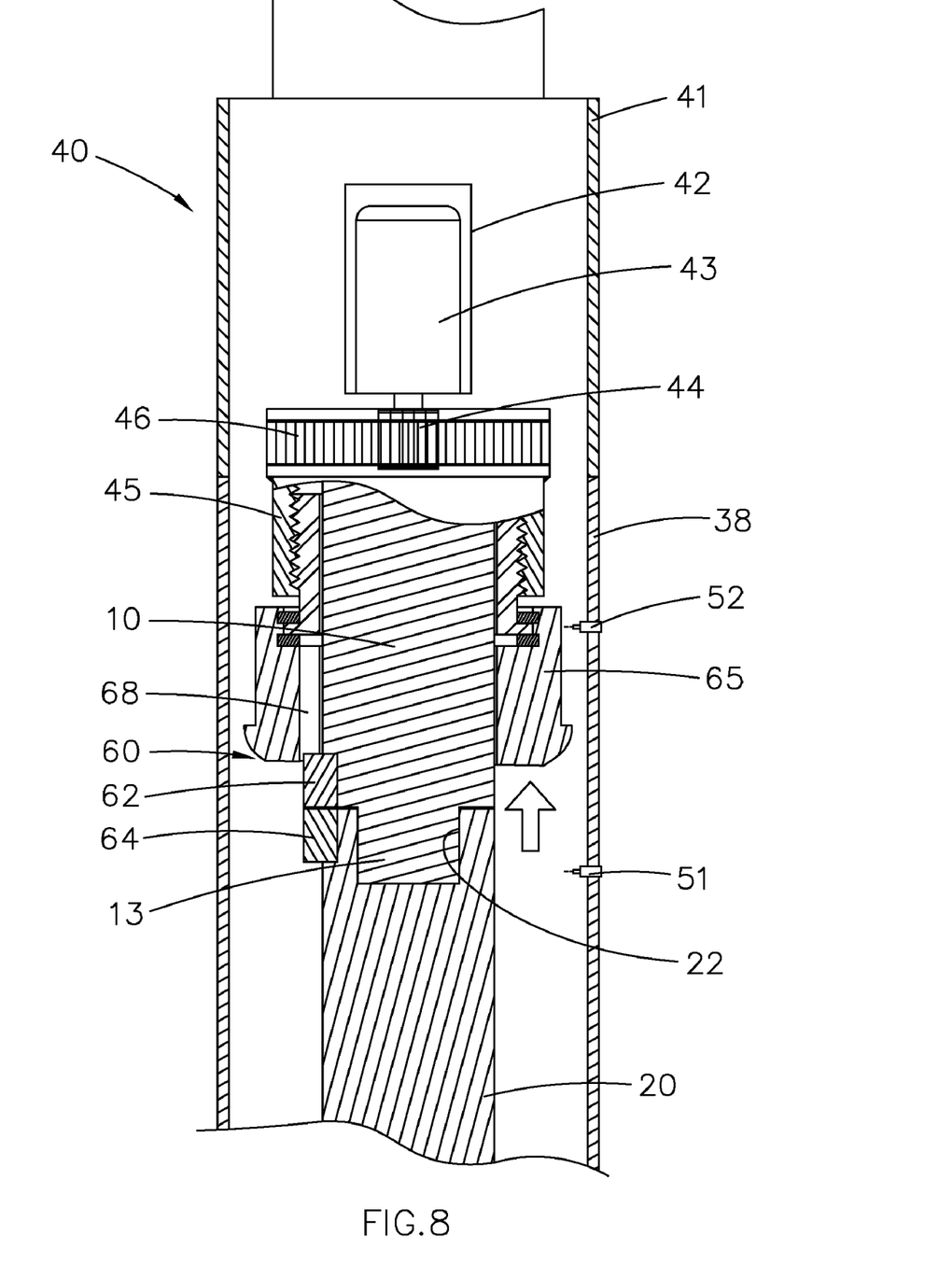
FIG. 8 shows the anti-theft device in another position than shown in FIG. 7.

Referring to FIGS. 6 through 8, there is shown an anti-theft device according to a second embodiment of the present invention. The second embodiment is like the first embodiment except several things. Firstly, the annular flange 11 is omitted. Secondly, the conical frustum 12 is omitted. Thirdly, the axial aperture 21 is omitted. Fourthly, the cutout 33 is omitted. Fifthly, a ridge 64 is formed on the second steering column 20. Sixthly, a collar 65 is used instead of the collar 34. The collar 65 defines a longitudinal groove 66 on an external side and two longitudinal grooves 68 on an internal side. The longitudinal groove 66 receives the ridge 39. A thread 650 is formed on the external side of the collar 65. The thread 650 is engaged with the thread 450. An annular flange 69 is formed on the external side of the collar 65.

Referring to FIG. 7, the actuating unit 40 is turned on so that the motor 43 rotates the pinion 44 in a direction. The pinion 44 rotates the gear 46. The gear 46 rotates the nut 45. Because of the engagement of the thread 450 with the thread 650 and the engagement of the longitudinal groove 66 with the track 39, the nut 45 moves the collar 65 to a lower position within the shell 38. The longitudinal grooves 68 receive the ridges 64 as well as the ridges 62. The rotation of the first steering column 10 causes the rotation of the second steering column 20. That is, the turning of the steering wheel 2 causes the operation of the universal joint 3.

Referring to FIG. 8, the actuating unit 40 is turned on so that the motor 43 rotates the pinion 44 in an opposite direction. The pinion 44 rotates the gear 46. The gear 46 rotates the nut 45. The nut 45 moves the collar 65 to an upper position. The longitudinal grooves 68 do not receive the longitudinal ridges 64. The rotation of the first steering column 10 does not cause the rotation of the second steering column 20. That is, the turning of the steering wheel 2 does not cause the operation of the universal joint 3.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An anti-theft device comprising:
a first steering column connected to a steering wheel;
a second steering column connected to a universal joint;
a clutch movable between a first position for connecting the first steering column to the second steering column and a second position for disconnecting the first steering column from the second steering column; and
an actuating unit for moving the clutch between the first and second positions,
wherein the clutch comprises a collar movable between the first and second positions, the collar being movable together with one of the first and second steering columns with respect to the other steering column; and
wherein one of the first and second steering columns is formed with an annular flange, and the clutch further comprises two C-clips for restraining the annular flange to the collar.

2. An anti-theft device comprising:
a first steering column connected to a steering wheel;
a second steering column connected to a universal joint;
a clutch movable between a first position for connecting the first steering column to the second steering column and a second position for disconnecting the first steering column from the second steering column; and
an actuating unit for moving the clutch between the first and second positions,
wherein the clutch comprises a collar movable between the first and second positions, the collar being movable together with one of the first and second steering columns with respect to the other steering column; and
wherein one of the first and second steering columns is formed with a ridge, and the other steering column defines a cutout for receiving the ridge in the first position.

3. The anti-theft device according to claim 2 wherein the steering column that defines the cutout comprises an inclined end for guiding the ridge into the cutout.

4. The anti-theft device according to claim 3 wherein the ridge is formed with a rounded end for sliding on the inclined end.

5. An anti-theft device comprising:
a first steering column connected to a steering wheel;
a second steering column connected to a universal joint;
a clutch movable between a first position for connecting the first steering column to the second steering column and a second position for disconnecting the first steering column from the second steering column; and
an actuating unit for moving the clutch between the first and second positions,
wherein the clutch comprises a collar;
wherein the actuating unit comprises a motor for moving the collar between the first and second positions and a nut formed with a thread and driven by the motor, and
wherein the collar is formed with a thread engaged with the thread of the nut.

6. The anti-theft device according to claim 5 wherein the actuating unit further comprises a pinion connected to a mandrel of the motor and a gear secured to the nut and engaged with the pinion.

7. The anti-theft device according to claim 5 wherein the actuating unit further comprises a shell formed with a track, and the collar defines a groove for receiving the track so that the collar is not rotational but movable within the shell.

8. The anti-theft device according to claim 7 further comprising a security unit for preventing excessive movement of the collar.

9. The anti-theft device according to claim 8 wherein the security unit comprises two sensors for stopping the motor on sensing the collar.

* * * * *